US006322763B1

(12) United States Patent
McDaniel

(10) Patent No.: US 6,322,763 B1
(45) Date of Patent: Nov. 27, 2001

(54) METHOD AND APPARATUS FOR REMOVING CARBONYL SULFIDE FROM A GAS STREAM VIA WET SCRUBBING

(75) Inventor: John E. McDaniel, Riverview, FL (US)

(73) Assignee: Teco, Inc., Tampa, FL (US)

( * ) Notice: Subject to any disclaimer, the term of this patent is extended or adjusted under 35 U.S.C. 154(b) by 0 days.

(21) Appl. No.: 09/460,634

(22) Filed: Dec. 14, 1999

Related U.S. Application Data
(60) Provisional application No. 60/112,335, filed on Dec. 15, 1998.

(51) Int. Cl.[7] .................................................... C10K 1/10
(52) U.S. Cl. .................................. 423/242.1; 423/243.01
(58) Field of Search ........................ 423/242.1, 243.01, 423/651, 652; 252/373

(56) References Cited

U.S. PATENT DOCUMENTS

| | | | |
|---|---|---|---|
| 2,434,868 | * | 1/1948 | Sample et al. .......................... 196/30 |
| 3,444,099 | * | 5/1969 | Taylor et al. ........................ 252/465 |
| 3,961,035 | | 6/1976 | Mickley ............................... 423/563 |
| 3,966,875 | | 6/1976 | Bratzler et al. ...................... 423/220 |
| 3,990,870 | | 11/1976 | Miczek ..................................... 55/92 |
| 4,073,832 | | 2/1978 | McGann .............................. 261/118 |
| 4,491,516 | * | 1/1985 | Polleck et al. ....................... 208/248 |
| 4,678,480 | | 7/1987 | Heinrich et al. .................. 48/197 R |
| 4,977,093 | * | 12/1990 | Cooke ................................... 436/119 |
| 5,279,646 | | 1/1994 | Schwab ................................ 95/201 |
| 5,298,228 | | 3/1994 | Palomares et al. ................. 423/210 |
| 5,314,666 | | 5/1994 | Palomares et al. ................. 422/191 |
| 5,330,562 | | 7/1994 | Anderson .............................. 95/108 |
| 5,345,756 | * | 9/1994 | Jahnke ............................... 60/39.02 |
| 5,484,471 | | 1/1996 | Schwab ..................................... 95/8 |
| 5,505,752 | | 4/1996 | Burrous et al. ....................... 55/250 |
| 5,523,069 | | 6/1996 | Lin .................................... 423/242.7 |
| 5,656,047 | | 8/1997 | Odom et al. ........................... 55/227 |
| 5,759,233 | | 6/1998 | Schwab ....................................... 95/8 |

FOREIGN PATENT DOCUMENTS

| | | |
|---|---|---|
| 43 21 542 C1 | 9/1994 | (DE) . |
| 0 005 138 A1 | 11/1979 | (EP) . |
| 0 443 661 A1 | 8/1991 | (EP) . |

OTHER PUBLICATIONS

Perry et al. (Editors) "Chemical Engineers' Handbook" (5th Ed.); McGraw–Hill Book Co., USA; ISBN 0–07–049478–9; p. 9–3, 1973.*

International Search Report for PCT.US99.29829 Filed Dec. 15, 1999.

* cited by examiner

Primary Examiner—Steven P. Griffin
Assistant Examiner—Timothy C Vanoy
(74) Attorney, Agent, or Firm—Wolf, Greenfield & Sacks

(57) ABSTRACT

Methods for removing carbonyl sulfide (COS) from a synthesis gas stream are disclosed. The method entails raising the water level of a wet scrubber so that hydrolysis of the COS may occur in the scrubber itself instead of a COS reduction chamber and no additional catalysts other than those naturally occurring in the production of the synthesis gas need be introduced into the scrubber. The water is raised, in one example, to a level such that water within an inner tube of the wet scrubber flows over an upper end of the inner tube. Raising the water level in the scrubber ensures intimate and vigorous interaction between the water, the COS, and the naturally occurring catalyst, and promotes the hydrolysis of the COS. In one example, the naturally occurring catalyst (e.g., alumina oxide) is present in the coal ash produced when coal is the fuel gasified that creates the synthesis gas stream.

7 Claims, 4 Drawing Sheets

LOW SCRUBBER LEVEL OPERATION

METHOD AND APPARATUS FOR REMOVING CARBONYL SULFIDE FROM A GAS STREAM VIA WET SCRUBBING

RELATED APPLICATION

This application claims priority to provisional application Serial No. 60/112,335, filed Dec. 15, 1998, the entire contents of which are incorporated by reference herein.

BACKGROUND OF THE INVENTION

1. Field of the Invention

This invention relates to the removal of carbonyl sulfide from an effluent stream of synthesis gas and, more particularly, to removing the carbonyl sulfide in a wet scrubber without having to introduce catalysts for the hydrolysis of the carbonyl sulfide other than those naturally occurring in the synthesis gas stream.

2. Description of the Related Art

In situations where fossil fuels are partially oxidized, otherwise known as gasification, (e.g., in a power plant or a refinery) a gaseous mixture is produced. This gaseous mixture is commonly called "synthesis gas" and will be referred to herein as such. Synthesis gas may be used as a fuel or a feedstock for the production of chemicals. When gasifying fossil fuels such as coal or other mixtures containing coal, the synthesis gas that is produced includes particulate matter such as coal ash.

The synthesis gas may also contain a variety of sulfur-containing compounds such as hydrogen sulfide, carbonyl sulfide, dimethyl sulfide, carbon disulfide, and other sulfides and disulfides, and may also include ethyl and methyl mercaptan, thiols, and other sulfur-containing compounds. If the synthesis gas stream is burned as a source of energy, the emissions therefrom are regulated by governmental standards that define the acceptable limits and chemical composition of sulfur-containing compounds that may be released into the air. These regulations, while being extremely valuable to preserving the environment in which we live, create additional expenses for those in the business providing electrical energy, in particular. These expenses are occasioned by the need to remove the sulfur-containing compounds from the synthesis gas stream so that the sulfur-containing compounds or their combustion products are not released into the environment.

One such sulfur compound that is subject to output limitations through regulation is sulfur dioxide. Sulfur dioxide ($SO_2$) is produced when, for example, hydrogen sulfide ($H_2S$) or carbonyl sulfide (COS) is burned. Governmental agencies, on the federal, state, as well as local level, have currently been reducing through regulations the amount of $SO_2$ which industrial plants may release into the air.

There are currently existing methods (i.e., acid gas removal systems) that reduce the amount of $H_2S$, in a synthesis gas stream. In turn, reducing the amount of $H_2S$ directly reduces the level of $SO_2$ that is emitted into the environment because $SO_2$ is formed when $H_2S$ is burned.

However, these acid gas removal systems are not effective in removing carbonyl sulfide (COS). When COS is burned it is converted into $SO_2$ and carbon dioxide ($CO_2$). Thus, in order to maintain lower $SO_2$ emission levels, the amount of COS in the synthesis gas stream must be reduced before being treated in an acid gas removal system. Thus, the ever-tightening restrictions on $SO_2$ emissions have created the need for the efficient and cost-effective methods and apparatus for removing COS from synthesis gas streams.

In order to reduce the amount of COS in the synthesis gas stream, a number of approaches have been proposed. The easiest to implement, when coal is the fuel, is simply to gasify coal that has a lower concentration of sulfur contained therein. If there is less sulfur in the coal, the amount of sulfur-containing products produced when the coal is gasified will be smaller. Because of the smaller amount of sulfur in the coal there is a lower concentration of sulfur containing products in the resulting synthesis gas. This, in turn, leads to a lower amount of COS being produced when the coal is gasified. Burning a synthesis gas with lower amounts of LOS, may yield $SO_2$ in quantities that are below the established emission limits. In that case, no processing of the synthesis gas is required in order to remove COS.

However, the price of coal is generally inversely proportional to its sulfur content; that is, the less sulfur in the coal, the more expensive the coal. The price of coal having sufficiently low sulfur concentrations such that removal of COS is not required is extreme; and in some cases (depending on market conditions) the cost of using such coal would actually create a financial loss as compared to the return based upon the energy produced from burning the coal. Further, as the world's supply of coal is further diminished, the price of low sulfur coal will continue to rise and low sulfur coal eventually will disappear.

Realizing that industry needs to gasify coal having appreciable sulfur contents, there has been much study of how to remove COS from synthesis gas streams. However, COS is one of the must difficult sulfur compounds to remove from synthesis gas streams. It has a low boiling point similar to propane, so it is difficult to remove therefrom by fractionation. It is relatively stable toward acidic reagents and is only slowly affected by strong alkalies. Thus, the prior art methods for its removal involve complex processes and technically complex apparatuses.

Another approach taken in the prior art is the catalytic conversion of COS to $H_2S$ via the COS hydrolysis reaction according to the following reaction:

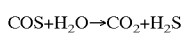

$$COS+H_2O \rightarrow CO_2+H_2S$$

$H_2S$ is much more easily removed from the synthesis gas than COS by treating the $H_2S$ in the synthesis gas steam with many common solvents. A typical process configuration utilizing COS hydrolysis is as follows.

The synthesis gas stream is output from a gasification chamber where coal is partially oxidized. On one hand, the partial oxidation of the coal provides a valuable source of energy as has been known for decades. On the other, it also produces compounds that, if not disposed of before combustion, create emissions that are unacceptable under the present emission laws.

This synthesis gas flows out of the gasification chamber through known exhaust piping. In some cases, a portion of the energy in the newly created synthesis gas, in the form of heat, is removed from the synthesis gas by a heat exchanger. The heat that is removed may be used later if desired. However, whether or not the synthesis gas is passed through a heat exchanger is optional and depends on the specific location where the process is being conducted.

Typically, synthesis gas contains excessive amounts of particulate matter. Thus, regardless of whether or not the synthesis gas is passed through a heat exchanger, the gas is then passed through a particulate removal device. The particulate matter is in the form of coal ash and the like. In order to remove this particulate matter many well-known particulate removal techniques and devices exist. For example, the device may be a dry device or a wet scrubber. Regardless of the type of device, the net effect is to remove, or at least reduce the amount of, the particulate matter from the synthesis gas. If a wet scrubber is used, water soluble-contaminants such as hydrogen chloride (HCL) are also removed from the synthesis gas stream. The particulate matter and the water-soluble contaminants should be removed in order for the hydrolysis of the COS to occur effectively, as is well known in the art. As is also well known in the art, in order for effective hydrolysis of COS to occur, the synthesis gas needs to be humidified. In the case of a wet scrubber, the scrubbing process also serves to humidify the synthesis gas. Due to the pressure in the scrubber and the temperature of the synthesis gas as it enters the scrubber, the temperature of the synthesis gas as it leaves the scrubber is typically about 300°–500° F.

The synthesis gas is then superheated by about 50° F. in order to evaporate any entrained water in the synthesis gas. Entrained water in the synthesis gas stream can damage an expensive catalyst contained in a downstream COS hydrolysis reaction chamber (discussed below). The superheated humidified synthesis gas is then passed through a COS hydrolysis reaction chamber in order to convert the COS to hydrogen sulfide ($H_2S$). This hydrolysis reaction chamber contains catalysts that are required for the COS hydrolysis reaction.

The synthesis gas, now having the COS sufficiently converted so that emissions standards are not violated when the synthesis gas is burned, is then cooled to condense the water vapor therefrom. The synthesis gas must be cooled before it is passed to well known acid gas removal systems for removing the $H_2S$ from the synthesis gas stream. Prior art acid gas removal systems typically operate at near ambient temperature (around 100° F.). After removal of the $H_2S$, the synthesis gas may then be combusted in a steam generator (boiler), or turbine and expelled into the atmosphere. Alternatively, the synthesis gas could be used for chemical synthesis, typically after a polishing sulfur removal step.

Systems that remove COS in this manner suffer from many drawbacks. The largest of these drawbacks are the expenditures associated with them. A major cost comes from having to purchase the catalysts contained in the COS hydrolysis reaction chamber. Typical COS reaction chambers contain at least one, if not more, extremely expensive catalysts that have finite lifetimes. At present the cost of such a reaction chamber can vary from several hundred thousand dollars to numbers in the low millions of dollars. Given that these catalysts have a finite lifetime, this capital expense must be born periodically; in some cases, every four to five years. If, for example, a power plant was designed to operate for 20 years, the expense of equipping the synthesis gas treatment system with COS reaction catalysts alone could require millions of dollars for catalyst replacement.

In other prior art methods, the COS levels in a gas stream may be abated by treating the gas stream with a series of chemicals chosen such that COS is removed. An example of such a process is disclosed in U.S. Pat. No. 5,523,069 to Lin which is incorporated herein by reference. However, the methods disclosed require complex treatment of the synthesis gas and are difficult to utilize.

SUMMARY OF THE INVENTION

The present invention overcomes the above and other drawbacks to conventional methods for the removal of carbonyl sulfide (COS) from synthesis gas. According to the present invention there is provided a method and system for removing COS that has a low cost and is compatible with existing synthesis gas processing apparatus so that the cost of retrofitting existing systems is low. These advantages and more are obtained, generally, by passing the synthesis gas through a wet scrubber where the wet scrubber and the overhead piping associated therewith have been flooded with water. Passing the synthesis gas through the water in the flooded wet scrubber allows the COS and the water to interact in the presence of a catalyst that is a natural by-product of the process that created the synthesis gas stream (e.g., coal ash). The vigorous and prolonged contact between the water, coal ash, and the COS in the scrubber and its overhead piping serves to promote COS hydrolysis such that the synthesis gas may be burned and its combustion products released into the atmosphere without having first been passed through a COS hydrolysis reaction chamber containing expensive catalysts.

Heretofore, it was not known, or even suspected, that one could remove COS from synthesis gas without having to pass the synthesis gas through a hydrolysis reaction chamber that contacts expensive catalysts with synthesis gas stream. Even more unexpectedly, it has been found that this can be accomplished in a conventional wet scrubber merely by flooding the wet scrubber and its associated output (overhead) piping with water. In one exemplary embodiment, the level of COS in a synthesis gas stream may be reduced without having to pass the synthesis stream gas through a COS hydrolysis reaction chamber. Further, because the synthesis gas stream is not passed through a COS hydrolysis chamber having water sensitive catalysts contained therein, there is no need to superheat the synthesis gas to ensure that the synthesis gas is not saturated with water. Also, because the synthesis gas is not superheated, there is a reduction in the amount of energy that needs to be provided to a cooling unit to remove the heat provided by superheating in order to condense most of the water out of the synthesis gas before passing it to an acid gas removal system.

In one embodiment of the present invention, a method of removing carbonyl sulfide from a synthesis gas stream is disclosed. The embodiment of this method includes steps of (a) flooding a wet scrubber with substantially clean water (b) providing the synthesis gas to the wet scrubber, and (c) bubbling the synthesis gas through the water in the wet scrubber so that the COS and the water interact in the presence of a catalyst that is a product of the process that created the synthesis gas stream.

In another embodiment of the present invention, an apparatus for removing carbonyl sulfide from a synthesis gas stream is disclosed. The apparatus of this embodiment includes a gasification chamber where sulfur containing compounds are partially oxidized to produce the synthesis gas stream. The apparatus of this embodiment also includes a wet scrubber that receives the synthesis gas stream and removes particulates and portions of the carbonyl sulfide from the synthesis gas stream. The water level in the wet scrubber is such that the carbonyl sulfide and water in the wet scrubber are brought into contact with each other in the presence of a catalyst that was produced when the sulfur containing compound was partially oxidized in the gasification chamber.

In another embodiment of the present invention, a method of operating a wet scrubber to reduce the amount of carbonyl sulfide in a synthesis gas stream produced by the gasification of coal, the synthesis stream being provided to the wet scrubber though an input and leaving the wet scrubber though an output, is disclosed. The method of this embodiment includes steps of: (a) providing water though at least one water input at an input rate and (b) simultaneously with step (a) removing water from the scrubber through at least one water output at an output rate, the output rate being less the input rate.

BRIEF DESCRIPTION OF THE DRAWINGS

The foregoing, and other objects and advantages, will be understood more clearly from the following detailed description and from the accompanying figures. This description is given by way of example only and in no way restricts the scope of the invention. This invention is illustrated with reference to the following drawings which show exemplary embodiments of the present invention. In the drawings, like reference numerals refer to the same or similar items and are arranged such that the leftmost digit of the reference numeral corresponds to the figure in which the item first appears. In the figures.

DETAILED DESCRIPTION

Most generally, the present invention relates to a method of removing COS from a synthesis gas stream. This is accomplished by promoting the hydrolysis of COS in a synthesis gas stream in a scrubber without having to introduce a catalyst other than those naturally occurring and present in the synthesis gas stream as a by-product of partially oxidizing (gasifying) a fossil fuel.

In general, the hydrolysis of COS contained in a synthesis gas stream occurs according to the following formula:

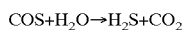

The reaction typically must have a catalyst to progress unless an extreme amount of heat is present.

Figure 1:
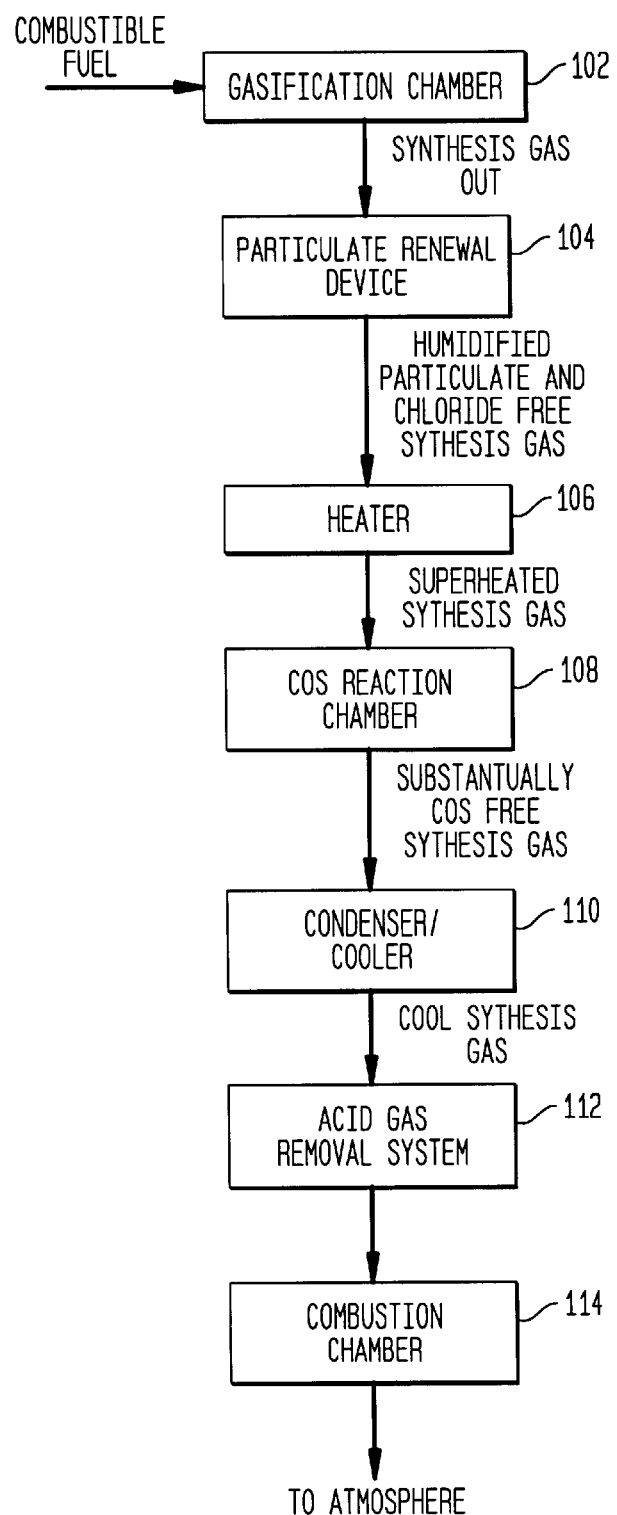
FIG. 1 is a block diagram of an example process by which the level of COS in a synthesis gas stream may be reduced.

FIG. 1 shows a simplified block diagram of an apparatus for removing COS from a synthesis gas stream. As shown, each process occurs in a block. The exact chemical process need not be completely described for each block as many of them are well known in the art. The direction the synthesis gas travels is shown by the arrows connecting the blocks of FIG. 1.

The apparatus of FIG. 1 includes a gasification chamber 102, a particulate removal device 104, a heater 106, a COS reaction chamber 108, a condenser/cooler 110, and an acid gas removal system 112. As described briefly above, the process as shown in FIG. 1 is an example process by which COS is removed from a synthesis gas steam according to the prior art. The operation of this prior art apparatus will now be described in greater detail.

First, a fossil fuel from which a synthesis gas stream may be created is introduced to the gasification chamber 102. In one example, the substance is coal that contains relatively high amounts of sulfur. However, according to this embodiment, as well as the present invention, the substance need not be limited to coal and may include any substance that produces COS when gasified. For example, the substance could be crude oil or any of its associated products such as petroleum coke or residual fuel oil, or another sulfur containing hydrocarbon-based fuel. The substance is gasified and, as it is gasified, a gas stream is created. For ease of discussion, only the gasification of coal will be discussed herein; however, it should be realized that this is by way of example only and any substance that produces a gas stream similar to that produced from coal could be used as fuel.

The gas stream created by the gasification of the fuel is referred to herein as synthesis gas. Immediately after the fuel (coal) is gasified, the synthesis gas is a particulate-laden mixture that includes several sulfur-containing compounds. The particulate material is primarily in the form of ash (i.e., coal ash) and often some residual unconverted carbon. The synthesis gas is then removed (i.e., let to escape) from the gasification chamber 102 via an outlet pipe.

Optionally, the synthesis gas may then be passed through a heat exchanger (not shown) to recover heat from the synthesis gas. As discussed above, the presence or absence of the heat exchanger is not of significant importance. However, as will be discussed in greater detail below, it may be desirable to exclude the heat exchanger so that the temperature of the synthesis gas remains high.

Next, the synthesis gas is passed through a particulate removal device 104. The device may be a wet scrubber or a dry particulate removal device. Typically, the particulate removal device 104 is a wet scrubber because the use of a dry scrubber would require an additional apparatus for humidifying the synthesis gas (not shown) so that the hydrolysis of the COS may occur and for the removal of other trace contaminants that could interfere with the hydrolysis (e.g., HCl). Thus, the particulate removal device serves two purposes. Examples of dry devices that remove particulates are electrostatic precipitators, filters and cyclones. However, because these dry devices do not effectively remove water soluble contaminants, it is preferred to use a wet scrubber. Accordingly, the term scrubbers and particulate removal device as used hereinafter both refer to wet scrubbers.

The synthesis gas is typically allowed to pass very rapidly through the wet scrubber 104. This entails allowing the gas to pass (i.e. bubble) through water that is present in the scrubber. The synthesis gas then quickly leaves the scrubber 104 through an overhead pipe. At this stage, the synthesis gas has had most of the particulate matter removed and now, additionally, has entrained water molecules present therein due to passing the synthesis gas through water. At this point, the amount of COS in the synthesis gas is relatively unchanged from the amount present when the synthesis gas left the combustion chamber 102. The wet scrubber also serves to remove chlorides from the synthesis gas. Chlorides, such as HCL, are very water soluble and thus, are easily removed from the synthesis gas with only a minimal exposure of the synthesis gas to water.

The substantially particulate-free, humidified synthesis gas must then be heated by the heater 106 to ensure that the synthesis gas is not saturated with water. Typically, the synthesis gas is heated by about an additional 50° F. in the heater 106. This amount of heating typically is sufficient to cause the entrained water in the synthesis gas stream to be reduced such that the stream is not saturated.

The synthesis gas is then provided to a COS reaction chamber 108. In this chamber, the synthesis gas is exposed to catalysts that cause the above-identified chemical reaction to occur (i.e., the hydrolysis of the COS). Namely, through hydrolysis, the COS combines with the water entrained in the synthesis gas to produce $H_2S$ and $CO_2$.

Next, the synthesis gas is cooled in the condenser/cooler 110. The condenser 110 cools the synthesis gas so that most of the water vapor is contains condenses and falls out of the gas. The condensed water is removed (i.e., drained) from the condenser 110.

After the condensation has occurred, the synthesis gas is then provided to the acid gas removal system 112. The acid gas removal system 112 removes both the $H_2S$ created by the hydrolysis of the COS as well as any $H_2S$ that was otherwise present in the synthesis gas. The synthesis gas is then burned in a combustion chamber 114. The combustion allows for the stored energy in the synthesis gas to be released and thereby, used for useful purposes, such as creating electrical power. The combustion products of the synthesis gas are then released into the atmosphere.

Figure 2:
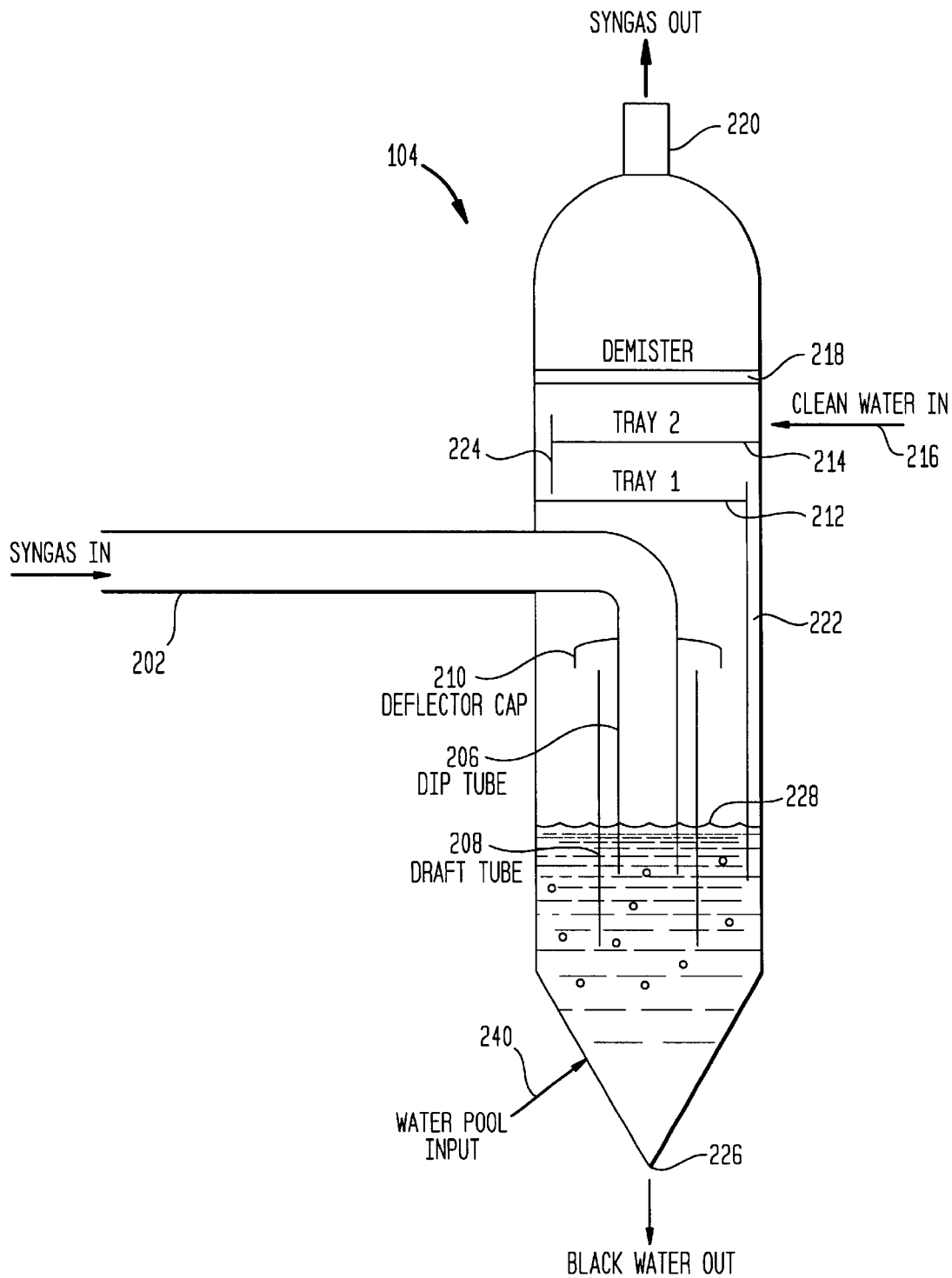
FIG. 2 is an embodiment of a wet scrubber used by the present invention.

FIG. 2 shows an exemplary embodiment of a wet scrubber 104 that may be utilized with a prior art system of the type depicted in FIG. 1. The wet scrubber 104 of FIG. 2 may be and preferably is, utilized according to the present invention. Heretofore it has been thought that a wet scrubber such as wet scrubber 104 only served to remove particulates and some contaminants from a synthesis gas stream that is pass through the scrubber, and possibly to cool the synthesis gas stream a bit.

Synthesis gas is provided to the scrubber 104 through the input nozzle 202. At this point, the synthesis gas contains a high quantity of particulate matter. In particular, the synthesis gas contains coal ash produced when the coal was gasified. From the input nozzle 202, the synthesis gas is then passed into a dip tube 206. The dip tube 206 extends into a region of the scrubber that contains liquid water. As shown in FIG. 2, the region is defined as the region below the water level line 228. The height of water level line 228 shown in FIG. 2 is illustrated by way of example only. Typically, the water level line 228 is kept relatively low in the scrubber 104.

As the synthesis gas containing water and particulates enters the water in the scrubber 104, the synthesis gas simply bubbles through the water pool leaving most of the particulates, e.g., coal ash, in the pool. (The pool of water at the bottom of the scrubber 104 is typically called "black water" due to the color imparted to it from the coal ash and other particulates that are left there.) There are typically two locations where the water in the scrubber 104 is input from. First, there is water pool input 240 which provides water to the scrubber 104 near the lower end of the dip tube 206. Second, there is a clean water input 216 that is discussed in greater detail below.

The synthesis gas, after bubbling up through the water and crossing the water level line 228, then contacts a series of trays. As shown, two trays, first tray 212 and second tray 214, exist in the scrubber 104. However, the number of trays is highly variable and can vary from as few as one to as many as are desired for a particular scrubber.

The trays preferably contain perforations to permit the passage of the ascending synthesis gas upward through the trays. The first and second trays, 212 and 214, also include first and second downcomers 222 and 224, respectively. Clean water is introduced above the second tray 214 through clean water input 216. This water typically has not had any, or at least not enough, of a catalyst to cause a COS hydrolysis added thereto. Water that has not had enough (or any) catalyst to cause a COS hydrolysis, shall be referred to as substantially clean water. The water flows downward through the second tray 214 to the first tray 212, and further, via the first downcomer 222, into the water pool at the bottom of the scrubber 104. Thus, the descending clean water and the rising synthesis gas travel counter-current to each other from tray to tray. The synthesis gas continues to rise and then travels through a demisting pad 218 which removes most of the entrained water from the synthesis gas and returns it the second tray 214.

The synthesis gas then rises out of the scrubber 104 through an output (overhead) pipe 220. As the synthesis gas leaves the scrubber, it is mildly humidified and is substantially particulate-free. The black water that pools in the bottom of the scrubber 104 is removed via an output 226. Water is also removed in the course of humidifying the synthesis gas stream. Typically, the water is removed (by both humidifaction and through output 226) at substantially the same rate at which clean water input 216 and water pool input 240 provide water to the scrubber. This ensures that the water level line 228 stays at a constant level. The level is typically significantly lower than the first tray 212 as well as the deflector cap 210. The function of the deflector cap 210 and the draft tube 208 of FIG. 2 will be discussed in greater detail below.

When operating the scrubber 104 as just described, which is the normal method of operating such a device, the amount of COS in the synthesis gas when it leaves the scrubber 104 is substantially the same as when the synthesis gas entered the scrubber 104. Thus, until the discovery that I have made as to how to operate a scrubber 104 to remove COS from a synthesis gas stream, it has been thought that a scrubber 104 was only useful for removing particulate matter and contaminants from the synthesis gas stream.

However, I have realized that by raising the level of the water level line 228 to substantially the same level as the deflector cap 210, or relatively near thereto, significant decreases in the amount of COS in the synthesis gas may be achieved. Raising the water level line 228, however, only achieves a portion of the decrease which is obtainable. By flooding the first and second trays, 212 and 214, respectively, as well as ensuring that the overhead pipe 220 is flooded with water, even larger amounts of COS may be removed.

It is believed that by flooding the scrubber 104 and the overhead pipe 220, a prolonged and more vigorous contact between the COS and the water is achieved. This prolonged contact increases the extent of the desired reaction.

However, as stated above, the reaction between COS and water is typified by the fact that it requires a catalyst in order to progress. It has been discovered that for coal, the very coal ash that the scrubber 104 is designed to remove contains an effective catalyst for the COS and water hydrolysis reaction. Thus, in order to increase the amount of time, as well as the violence with which the COS, water, and coal ash interact, it has been determined that flooding the scrubber 104 can ensure a sufficient amount of contact with required ferocity in order to spawn a reaction between the COS and the water. This allows for bubbling the synthesis gas through the water in the wet scrubber 104 so that the COS and the water interact in the presence of a catalyst that is a natural by-product of the process that created the synthesis gas stream. Advantageously, no additional catalysts need to be added to the water in order for this reaction to occur and thereby, a substantial savings in the cost of such catalysts is realized.

The scrubber 104 may be flooded in a variety of ways, however, it is believed that the most effective way to flood the scrubber is to ensure that the rate at which the influx of water provided by both the clean water input 216 and water pool input 240 exceeds the rate at which output 226 can remove water from the scrubber 104. Further, the rate at which water is input through clean water input 216 should be greater than the rate at which water may flow through the downcomers 222 and 224. This ensures that not only is the pool flooded, but also the overhead pipe 220 is flooded.

Coal ash may act as a catalyst because it contains, among other things, alumina oxide. Alumina oxide is a known catalyst for the COS/water reaction. The catalyst is present in the pool in the bottom of the scrubber 104, and by flooding the scrubber 104, a vigorous and lengthy contact between the water and the COS in the presence of catalyst can be achieved. Further, once the COS has begun reacting, with the water, further exposure to water (which still has some coal ash in it) in the overhead pipe 220 ensures that reaction the continues long, enough to convert enough COS into $H_2S$ so that additional processing of the synthesis gas stream to remove COS need not be done before the synthesis gas is burned.

The contact between the water, COS and coal ash has been briefly described; however, this interaction will be further described with reference to FIGS. 3 and 4.

Figure 3:
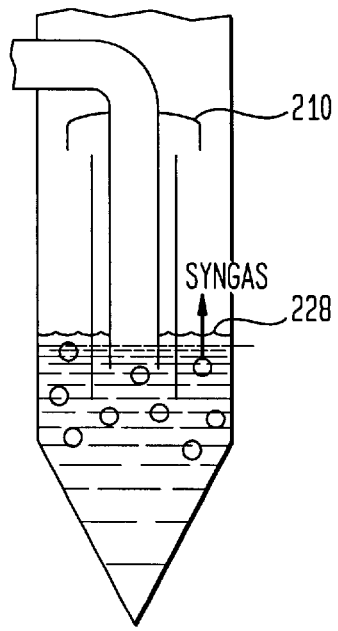
FIG. 3 is an embodiment of the wet scrubber shown in FIG. 2 that illustrates the level of water in the wet scrubber practiced in the prior art.

FIG. 3 shows a typical water level line 228 for operating a wet scrubber 104 as shown in FIG. 2. As can be seen, the water level line 228 is quite far below the deflector cap 210. When operating in this manner, the synthesis gas merely bubbles out of the water, leaving, the coal ash quickly behind. This, and the removal of water-soluble contaminants, has heretofore been all that was expected of such scrubbers.

Figure 4:
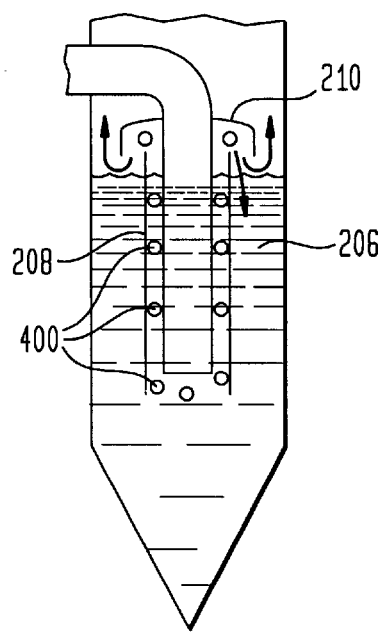
FIG. 4 is an embodiment of the wet scrubber shown in FIG. 2 in an example of a flooded state in order to remove COS from the synthesis gas stream according to the present invention.

Referring now to FIG. 4, an example is depicted to show how the synthesis gas interacts with the water in the scrubber 104 when the scrubber is flooded, according to an exemplary embodiment of the present invention. Flooding the scrubber 104 causes the hydraulic pressure outside the draft tube 208 to rise. When the hydraulic pressure is high, the synthesis gas flows up the annulus between the dip tube 206 and the draft tube 208 in a three-phase (synthesis gas, water, and particulates) flow regime. This is illustrated in FIG. 4 by the bubbles 400 rising up between the dip tube 206 and the draft tube 208. Additional water is drawn into the bottom of the annulus between the dip tube 206 and the draft tube 208 when this occurs. This action produces more intimate and vigorous contact between the gas, water and particulates, and thereby results in better particulate removal. However, as described above, this intimate contact also serves to promote the hydrolysis reaction of the COS and is thus very desirable when attempting to remove COS from synthesis (,as in a wet scrubber.

Further, as the water (as well as the synthesis gas) rises between the dip tube 206 and the draft tube 208 it is directed downwardly by the deflector cap 210. Typically, the gas would just continue to rise, the water and particulate matter would fall, and the contact between the water and the COS in the presence of the catalyst provided by the coal ash would cease. However, collected data indicates that a significant amount of water entrainment occurs in the area near the deflector cap 210. This indicates that the gas leaving the deflector cap 210 impacts the water surface again (the level of the water being relatively close to the level of the deflector cap 210) causing a great deal of turbulence leading to the entrainment. Further, the high water flow into the area between the dip tube 206 and the draft tube 208 creates a vortex action that causes further vigorous contact.

Referring back now to FIG. 2, the entrained water and coal ash are carried upward with the synthesis gas to the first tray 212. The first downcomer 222 is typically not sized to accommodate both the entrained water in the synthesis gas and the flowing downward from the second downcomer 224. This leads to the flooding of the first tray 212. Synthesis gas, water and coal ash pass through the first tray 212 up to the second tray 214 which is has also been flooded. They entire overhead volume of the scrubber 104 is eventually flooded, including the overhead pipe 220. However, the additional water now contained in the overhead pipe 220 will require some sort of water removal means downstream from the scrubber 104, for example, the condenser 110 of FIG. 1.

Thus, it appears, that wholly unexpectedly I have achieved a method for reducing the amount of COS present in a synthesis gas stream by flooding a prior art wet gas scrubber.

The practical implications of this discovery are considerable. As described above with respect to FIG. 1, the removal of COS from synthesis gas typically involves using an expensive COS reaction chamber 108. Because of the discovery that COS may be removed from a stream of synthesis gas using only a scrubber having clean water in it, the expensive COS reaction chamber may be removed.

Figure 5:
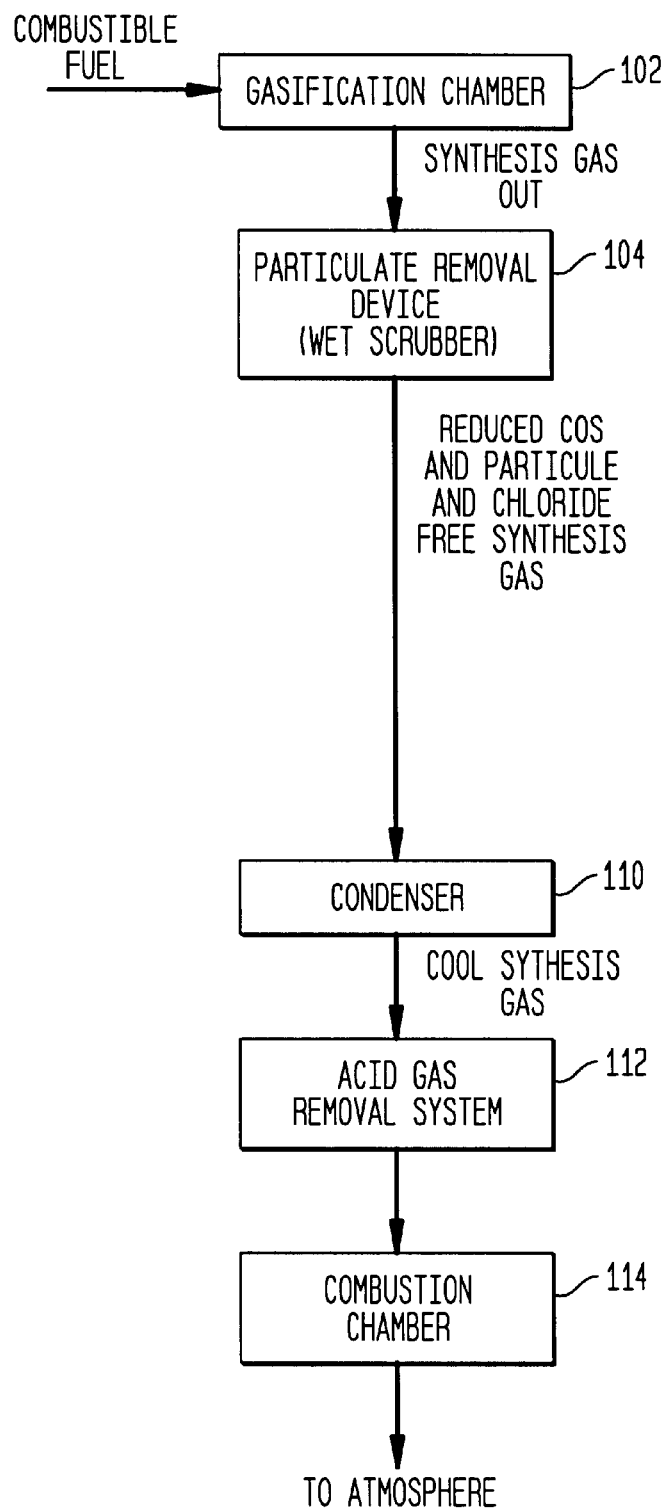
FIG. 5 is a block diagram of a process by which COS may be removed from a synthesis gas stream according to an embodiment of the present invention.

This may also be seen with reference to FIG. 5, which shows the limited number of blocks required to carry out the removal of COS from synthesis gas when a wet scrubber is operated in the manner discussed above (i.e., flooded). As shown in FIG. 5, only five of the seven blocks shown in FIG. 1 are needed to remove COS from a synthesis gas stream produced by gasification of coal having some level of sulfur contained in it. In particular, the process for removing COS according to one embodiment includes gasifying the coal in a gasification chamber 102 which produces a stream of synthesis gas containing particulate matter (e.g., coal ash) and COS, removing both particulate matter and COS from the synthesis gas stream in a scrubber 104 (when the scrubber is operated in accordance with the present invention), cooling the output of the scrubber 104 in a condenser 110 to remove water from the synthesis gas stream, providing the synthesis gas stream to an acid gas removal system 112 to remove the $H_2S$ from the synthesis gas, and burning the synthesis gas in a combustion chamber 114 before it is released into the atmosphere.

As discussed in greater detail above, when sulfur-containing coal is gasified in the gasification chamber 102, a stream of synthesis gas is produced that contains particulate matter as well as amounts of COS, that when burned, would produce amounts of $SO_2$ in excess of what current emissions laws allow to be released into the atmosphere.

Optionally, the synthesis gas may then be provided to a heat exchanger (not shown) in order to extract heat energy from the synthesis gas stream for use in other applications or steps in the treatment of the synthesis gas stream. However, this heat exchanger is not necessary. In some cases, the presence of a heat exchanger may actually serve as a detriment to the removal COS in the scrubber 104. The hydrolysis reaction of COS actually is more efficient if conducted at higher temperatures, at least up to the point of thermodynamic equilibrium. If the heat exchanger removes too much of the heat from the synthesis gas stream, the gas stream may be cooler than allows for the optimal hydrolysis of the COS in the synthesis gas stream. However, conditions may vary such that the need for the energy from the synthesis gas stream removed from by a heat exchanger outweighs the reduction in hydrolysis efficiency and therefore, a heat exchanger is preferable. Regardless of whether a heat exchanger is present, if the scrubber 104 is operated in a manner in accordance with the present invention, COS may be removed from the synthesis gas stream in the scrubber 104.

The synthesis gas is then passed to the scrubber 104 which is preferably a wet scrubber having only clean water provided thereto. The scrubber 104 removes chlorides and particulate matter from the synthesis gas no matter how it is operated. However, if the scrubber 104 is operated in accordance with the present invention, substantial amounts of COS are also removed therein.

At this point, the synthesis gas is provided directly to the condenser 110 to remove entrained water from the synthesis gas stream. Note that, as compared to FIG. 1, providing the synthesis gas directly to the condenser 110 bypasses both the heater 106 (not shown in FIG. 5) and the COS reaction chamber 108 (also not shown in FIG. 5). The profound advantages to bypassing these two items are readily apparent when one considers the costs involved with obtaining and operating them.

For example, because the COS reaction chamber is not needed, there is no need to superheat the synthesis gas stream to ensure that it is not water saturated. Thus, the heater 106 of FIG. 1 need not be purchased, resulting in a capital expenditure savings at least equal to the cost of a suitable heater. Further, because there is no heater, the expense of operating a heater is avoided. This results in saving the cost of operating a heater such as, for example, electricity or fuel needed to operate the heater and maintenance of the heater. Additionally, the monitoring equipment that is typically present to ensure the heater is operating correctly is no longer needed.

However, the most profound savings comes from not having to purchase catalysts for the COS reaction chamber. As discussed above, these chambers contain extremely expensive catalysts and the cost of purchasing such a unit can be upwards of a couple million dollars. Further, the catalysts in the reaction chambers must be periodically replaced, adding additional costs.

Additionally, removing both of these units saves in the physical space required to contain a system to cleanse synthesis gas. As the cost of physical space increases, such as due to inflation, it is preferable to use as much space as possible for revenue generating activities instead of compliance measures. If two space-consuming devices are not required, the space that normally would be required could be used for other purposes.

Thus, it is quite apparent that the unexpected discovery that COS may be removed in existing wet scrubbers, and the resulting reduction in capital expenditures occasioned by this discovery, holds great financial as well as environmental rewards.

Also, in some cases the amount of COS removed in the wet scrubber when operated in accordance with the present invention, may not be sufficient to meet certain environmental standards or for the creation other of end uses of synthesis gas such as chemical manufacture. In these cases, it may still be necessary to employ a heater and COS reaction chamber. However, because the level of COS in the synthesis gas has been reduced significantly in the scrubber 104 as operated in accordance with the present invention, the efficiency of the COS reaction chamber need not be as great. Thus, the COS reaction chamber may be a cheaper version that is not as efficient. This reduction in expense alone could be quite significant. These advantages all flow from the discovery that operating a wet scrubber so that water and COS vigorously contact one another in the presence of the coal ash that is a natural by-product of gasifying coal, serves to reduce the amount of COS in a synthesis gas stream.

EXAMPLE

The following example is presented to further illustrate and explain the present invention and should not be taken as limiting in this regard. This example summarizes the results of tests performed using a synthesis gas treatment system having a conventional wet scrubber similar to the one illustrated in FIGS. 2–4. The wet scrubber in this case actually comprised two parallel wet scrubbers, each receiving approximately one-half of the synthesis gas stream.

Typically, each scrubber is operated having a water level line approximately 42 inches above the base of the scrubber. The total COS concentration in the synthesis gas stream at the output of both scrubbers is in the range of 320 ppm.

When the water level of one of the scrubbers was raised to a relatively high level, approximately 55–60 inches (e.g., the scrubber was flooded), the concentration of COS in the synthesis gas stream fell to about 270 ppm. This represents about a 16% reduction in the amount of COS in the synthesis gas stream.

Next, the water level in the second scrubber was raised to a relatively high level, approximately 55–60 inches. This led to a further decrease in the COS concentration; the reduction was approximately another 50 ppm. Thus, the concentration COS, when both scrubbers were being operated according to the present invention, dropped approximately 100 ppm to a level of 220 ppm. This translates into approximately a 30% drop in the COS contained in the synthesis gas after passing through the scrubbers.

While various embodiments and examples of the present invention have been described above, it should be understood that they are presented by way of example only, and are not intended as limitations. For example, the exact configuration of the scrubber and the waters levels described therein are not the only ones where the present invention may operate; the only requirement is that, in the scrubber and its overhead piping, the synthesis gas and water come into intimate and vigorous contact in the presence of a catalyst, such as coal ash. Further, coal ash has been explained as being a catalyst that naturally occurs when coal is gasified; other naturally occurring catalysts may exist in, for example, the gasification of crude oil or any other hydro-carbon based fuel; and the present invention is equally compatible with a system for removing COS from a gas stream produced in the burning thereof. Accordingly, the breadth and the scope of the present invention should not be limited by any of the above-described exemplary embodiments or examples, but are defined only in accordance with the following claims and their equivalents.

What is claimed is:

1. A method of removing carbonyl sulfide from a synthesis gas stream comprising the steps of:
    (a) flooding a wet scrubber with substantially clean water, the step of flooding including filling the wet scrubber to a level such that water within an inner tube of the wet scrubber flows over an upper end of the inner tube;
    (b) providing the synthesis gas to the wet scrubber; and
    (c) bubbling the synthesis gas through the water in the wet scrubber so that the water hydrolyses the carbonyl sulfide to produce carbon dioxide and hydrogen sulfide, the hydrolysis occurring in the presence of a catalyst, wherein said catalyst is a product of the process that created the synthesis gas stream.

2. The method of claim 1, wherein the step of flooding the wet scrubber includes a step of raising the water level in the scrubber to substantially the same level as a location in the wet scrubber where synthesis gas is deflected down after passing through the water in a base of the scrubber.

3. The method of claim 2, wherein the step of the flooding the wet scrubber also includes a step of flooding at least one overhead tray of the wet scrubber.

4. The method of claim 2, wherein the step of flooding the wet scrubber also includes flooding an overhead output pipe of the wet scrubber.

5. The method of claim 4, further including a step (d) of allowing the synthesis gas stream to exit the wet scrubber through the flooded overhead output pipe.

6. A method of operating a wet scrubber to reduce the amount of carbonyl sulfide in a synthesis gas stream produced by the gasification of coal, the synthesis stream being provided to the wet scrubber though an input and leaving the wet scrubber though an output, the method comprising steps of:

(a) providing water though at least one water input at an input rate; and (b) providing the synthesis gas and coal ash to the wet scrubber (c) simultaneously with step (a) removing water from the scrubber through at least one water output at an output rate, the output rate being less the input rate, such that the wet scrubber is filled to a level such that water within an inner tube of the wet scrubber flows over an upper end of the inner tube and wet scrubber is flooded.

7. The method of claim 6, wherein the step of providing water includes providing water from a first water input and a second water input, the first water input being located above a tray of the scrubber and the second water input being below the tray.

* * * * *